US012667802B2

(12) United States Patent
     Xue et al.

(10) Patent No.: US 12,667,802 B2
(45) Date of Patent: Jun. 30, 2026

(54) GAS-LIQUID SEPARATOR

(71) Applicants: York (Wuxi) Air Conditioning and Refrigeration Co., Ltd., Wuxi (CN); Johnson Controls Tyco IP Holdings LLP, Milwaukee, WI (US)

(72) Inventors: Fang Xue, Wuxi (CN); Xiuping Su, Wuxi (CN); Lu Mei, Wuxi (CN); Zaikun Min, Wuxi (CN)

(73) Assignees: York (Wuxi) Air Conditioning and Refrigeration Co., Ltd., Wuxi (CN); Tyco Fire & Security GmbH, Neuhausen am Rheinfall (CH)

( * ) Notice: Subject to any disclaimer, the term of this patent is extended or adjusted under 35 U.S.C. 154(b) by 547 days.

(21) Appl. No.: 18/016,500

(22) PCT Filed: Jul. 7, 2021

(86) PCT No.: PCT/CN2021/104975
     § 371 (c)(1),
     (2) Date: Jan. 17, 2023

(87) PCT Pub. No.: WO2022/017183
     PCT Pub. Date: Jan. 27, 2022

(65) Prior Publication Data
     US 2023/0311041 A1     Oct. 5, 2023

(30) Foreign Application Priority Data
     Jul. 20, 2020 (CN) .......................... 202021428058.3

(51) Int. Cl.
     B01D 45/16 (2006.01)
     B01D 45/06 (2006.01)
(52) U.S. Cl.
     CPC ............. B01D 45/16 (2013.01); B01D 45/06 (2013.01)

(58) Field of Classification Search
     CPC ................................ B01D 45/16; B01D 45/06
     See application file for complete search history.

(56) References Cited

U.S. PATENT DOCUMENTS 2,610,697 A * 9/1952 Lovelady ............... B01D 45/02
                                                    210/801
2,751,998 A * 6/1956 Glasgow ................ C10G 33/06
                                                    210/708
(Continued)

FOREIGN PATENT DOCUMENTS

CN      201394406 Y     2/2010
CN      102100988 B     8/2012
(Continued)

OTHER PUBLICATIONS

European Extended Search Report for EP Application No. 21846446. 9, dated Apr. 26, 2024, 17pages.
(Continued)

*Primary Examiner* — Dung H Bui
(74) *Attorney, Agent, or Firm* — Fletcher Yoder, P.C.

(57) ABSTRACT

A gas-liquid separator includes a housing and a separation cylinder assembly. The housing includes a cylindrical housing side wall, and a first and second end plates. A housing inlet is on the first end plate and an upper housing outlet is on the housing side wall. The separation cylinder assembly is in a housing accommodating cavity, and the axis thereof is transverse to the axis of the cylindrical housing side wall. The separation cylinder assembly has an inner cylinder in an outer cylinder. A separation space is in communication with the housing inlet. The upper outlet is in communication with the separation space and the housing accommodating cavity.

10 Claims, 6 Drawing Sheets

(56) References Cited

U.S. PATENT DOCUMENTS

| | | | | |
|---|---|---|---|---|
| 3,291,385 | A | * | 12/1966 | Williams ................ F04C 18/16 |
| | | | | 55/467 |
| 3,888,644 | A | * | 6/1975 | Holland ................ B01D 46/00 |
| | | | | 55/318 |
| 4,059,517 | A | * | 11/1977 | Strahorn ............ B01D 17/0208 |
| | | | | 96/184 |
| 4,070,168 | A | * | 1/1978 | Beattie .............. B01D 19/0057 |
| | | | | 55/460 |
| 4,180,391 | A | * | 12/1979 | Perry, Jr. ............... B01D 50/00 |
| | | | | 55/424 |
| 4,187,089 | A | | 2/1980 | Hodgson |
| 4,232,533 | A | * | 11/1980 | Lundblad .................. F25B 1/10 |
| | | | | 62/509 |
| 4,297,116 | A | * | 10/1981 | Cusick .............. B01D 46/0031 |
| | | | | 55/528 |
| 4,359,329 | A | * | 11/1982 | Willeitner .............. B01D 50/20 |
| | | | | 210/DIG. 5 |
| 4,539,023 | A | | 9/1985 | Boley |
| 4,919,777 | A | * | 4/1990 | Bull .................... B01D 17/045 |
| | | | | 210/260 |
| 6,080,217 | A | * | 6/2000 | Gobl ........................ B04C 5/28 |
| | | | | 55/385.2 |
| 6,214,092 | B1 | * | 4/2001 | Odom .................... E21B 43/35 |
| | | | | 96/170 |
| 6,214,220 | B1 | * | 4/2001 | Favret, Jr. .......... B01D 17/0208 |
| | | | | 210/260 |
| 6,350,299 | B1 | * | 2/2002 | Dekker .............. B01D 19/0047 |
| | | | | 55/330 |
| 6,409,808 | B1 | * | 6/2002 | Chamberlain ......... B01D 17/00 |
| | | | | 96/182 |
| 6,673,135 | B2 | * | 1/2004 | West ...................... B01D 45/16 |
| | | | | 95/271 |
| 6,709,500 | B1 | | 3/2004 | West |
| 6,979,360 | B1 | * | 12/2005 | Cetinkaya ............ C10G 11/182 |
| | | | | 95/271 |
| 7,001,448 | B1 | * | 2/2006 | West ...................... B01D 45/16 |
| | | | | 95/271 |
| 7,270,690 | B1 | * | 9/2007 | Sindel .................... B01D 45/08 |
| | | | | 55/440 |
| 7,325,750 | B2 | * | 2/2008 | Shutic .................... B05B 14/45 |
| | | | | 55/315 |
| 8,337,603 | B2 | | 12/2012 | Akhras et al. |
| 8,470,080 | B1 | | 6/2013 | Ball, IV et al. |

| | | | | |
|---|---|---|---|---|
| 8,505,331 | B2 | | 8/2013 | Pham et al. |
| 8,882,873 | B2 | * | 11/2014 | Brownlee ............... F23C 10/18 |
| | | | | 95/271 |
| 9,890,977 | B2 | | 2/2018 | Li et al. |
| 10,792,604 | B2 | * | 10/2020 | Steiner ................... B01D 45/16 |
| 10,800,986 | B1 | * | 10/2020 | Ball, IV ................. C10G 73/30 |
| 10,921,033 | B2 | | 2/2021 | Ma et al. |
| 11,268,361 | B2 | * | 3/2022 | Jensen ............... B01D 19/0042 |
| 11,395,981 | B2 | * | 7/2022 | Karime ............. B01D 21/2494 |
| 2003/0150324 | A1 | * | 8/2003 | West ................... B01D 17/0211 |
| | | | | 95/268 |
| 2009/0049809 | A1 | * | 2/2009 | Christiansen ............. B04C 3/06 |
| | | | | 55/319 |
| 2009/0196806 | A1 | * | 8/2009 | Larnholm ............... B04C 5/103 |
| | | | | 422/269 |
| 2011/0209446 | A1 | * | 9/2011 | Kayat .................... B01D 45/12 |
| | | | | 55/322 |
| 2011/0247500 | A1 | * | 10/2011 | Akhras .............. B01D 17/0217 |
| | | | | 96/182 |
| 2014/0237758 | A1 | * | 8/2014 | Conrad ...................... A47L 5/24 |
| | | | | 15/353 |
| 2014/0352539 | A1 | * | 12/2014 | Schleiden .............. B01D 46/56 |
| | | | | 95/272 |
| 2017/0008014 | A1 | * | 1/2017 | Van Wolferen ....... A47L 9/1666 |
| 2018/0369731 | A1 | * | 12/2018 | Mueller ................. B01D 45/16 |
| 2019/0063437 | A1 | * | 2/2019 | Jambigi ............... F04C 29/026 |
| 2020/0155986 | A1 | * | 5/2020 | Magnus ................ B01D 45/08 |
| 2020/0248942 | A1 | * | 8/2020 | Berrichon ............. B01D 45/06 |
| 2022/0111403 | A1 | * | 4/2022 | Koopmans ........... A47L 9/1658 |
| 2022/0288709 | A1 | * | 9/2022 | Hua ........................ B01D 46/24 |
| 2023/0111882 | A1 | * | 4/2023 | Steiger ..................... B04C 9/00 |
| | | | | 96/414 |

FOREIGN PATENT DOCUMENTS

| CN | 102671470 | A | 9/2012 |
|---|---|---|---|
| CN | 103256761 | B | 2/2015 |
| CN | 104154688 | B | 10/2016 |
| CN | 106642847 | B | 5/2022 |

OTHER PUBLICATIONS

PCT International Search Report for PCT Application No. PCT/
CN2021/104975, mailed Jan. 27, 2022, 2 pgs.

* cited by examiner

GAS-LIQUID SEPARATOR

CROSS-REFERENCE TO RELATED APPLICATIONS

This application is a U.S. National Stage Application of PCT Application No. PCT/CN2021/104975, entitled "GAS-LIQUID SEPARATOR," filed Jul. 7, 2021, which claims priority to and the benefit of Chinese Patent Application No. 202021428058.3, filed Jul. 20, 2020, each of which is herein incorporated by reference in its entirety for all purposes.

BACKGROUND

Technical Field

This application relates to the field of gas-liquid separation devices.

Related Art

Conventional gas-liquid separators include a vertical gas-liquid separator and a horizontal gas-liquid separator. The vertical gas-liquid separator separates a gas-liquid mixture through centrifugation, and the horizontal gas-liquid separator separates the gas-liquid mixture through a large space. However, the vertical gas-liquid separator is relatively high, difficult to mount, and noisy. The horizontal gas-liquid separator has a large size. Therefore, a gas-liquid separator is required, which is relatively low, can adapt to different sites, and has low noise.

SUMMARY

Exemplary embodiments of this application can solve at least some of the above problems. Provided in this application is a gas-liquid separator. The gas-liquid separator includes a housing and a separation cylinder assembly. The housing includes a cylindrical housing side wall and a first end plate and a second end plate located at two opposite ends of the housing side wall. A housing accommodating cavity is defined by the housing side wall, the first end plate, and the second end plate. The housing further includes a housing inlet and an upper housing outlet. The housing inlet is provided on the first end plate, and the upper housing outlet is provided at an upper part of the housing side wall. The separation cylinder assembly is arranged in the housing accommodating cavity, and an axis of the separation cylinder assembly is arranged transversely to an axis of the cylindrical housing side wall. The separation cylinder assembly includes an outer cylinder and an inner cylinder arranged in the outer cylinder, the outer cylinder is supported on a bottom part of the housing side wall. The separation cylinder assembly further includes a separation space defined between the outer cylinder and the inner cylinder and located at an upper part of the separation cylinder assembly, a lower space located at a lower part of the separation cylinder assembly, and an upper outlet located at the upper part of the separation cylinder assembly. The separation space is in communication with the housing inlet, and the upper outlet is in communication with the separation space and the housing accommodating cavity.

According to the gas-liquid separator provided in this application, the gas-liquid separator further includes a liquid storage device. The liquid storage device is arranged below the housing side wall and in communication with the housing accommodating cavity and the lower space of the separation cylinder assembly. The liquid storage device is arranged at a set distance from the lower space of the separation cylinder assembly.

According to the gas-liquid separator provided in this application, a bottom part of the inner cylinder is at a set distance from the bottom part of the housing side wall, and the lower space is defined by the outer cylinder.

According to the gas-liquid separator provided in this application, a lower outlet is provided at the outer cylinder defining the lower space, and the liquid storage device is in communication with the lower space through the lower outlet and the housing accommodating cavity.

According to the gas-liquid separator provided in this application, the lower outlet is provided on a side of the outer cylinder facing away from the liquid storage device.

According to the gas-liquid separator provided in this application, a bottom part of the outer cylinder is enclosed by the housing, and a lower outlet is provided at the housing enclosing the bottom part of the outer cylinder. The liquid storage device is in communication with the lower space through the lower outlet.

According to the gas-liquid separator provided in this application, the gas-liquid separator further includes a connecting tube. One end of the connecting tube is connected to the lower outlet, and an other end of the connecting tube is connected to the liquid storage device.

According to the gas-liquid separator provided in this application, the gas-liquid separator further includes at least one blocking member. The at least one blocking member is arranged in the housing accommodating cavity around the upper housing outlet. The at least one blocking member is configured to change a movement path of a fluid flowing from the upper outlet of the separation cylinder assembly to the upper housing outlet.

According to the gas-liquid separator provided in this application, the at least one blocking member includes a blocking plate and a blocking box. The blocking plate is located between the upper housing outlet and the upper outlet of the separation cylinder assembly in an axial direction of the cylindrical housing side wall and extends downward from a top of the cylindrical housing side wall beyond the upper outlet of the separation cylinder assembly. The blocking box is arranged around the upper housing outlet, and a plurality of communication holes are provided on a side wall of the blocking box.

According to the gas-liquid separator provided in this application, the at least one blocking member includes a blocking tube, a transverse blocking plate, and a vertical blocking plate. The blocking tube surrounds the upper housing outlet and extends downward from a top of the housing side wall. The transverse blocking plate is arranged below the blocking tube and at a set distance from a bottom part of the blocking tube. The vertical blocking plate extends upward from the transverse blocking plate and is located between the blocking tube and the upper outlet of the separation cylinder assembly in the axial direction of the cylindrical housing side wall.

The gas-liquid separator provided in this application has advantages such as having high separation efficiency, low noise, and a small size.

Other features, advantages, and embodiments of this application can be described or become apparent by considering the following specific implementations, accompanying drawings, and claims. In addition, it should be understood that the above application contents and the following specific implementations are exemplary and are intended to provide further explanation without limiting the scope of the claimed application. However, the specific implementations and specific examples only indicate preferred embodiments of this application. Various changes and modifications within the spirit and scope of this application will be apparent to those skilled in the art through the specific implementations.

BRIEF DESCRIPTION OF THE DRAWINGS

The features and advantages of this application can be better understood by reading the following detailed description with reference to the accompanying drawings. In the accompanying drawings, the same reference numerals indicate the same components.

DETAILED DESCRIPTION

Figure 1A:
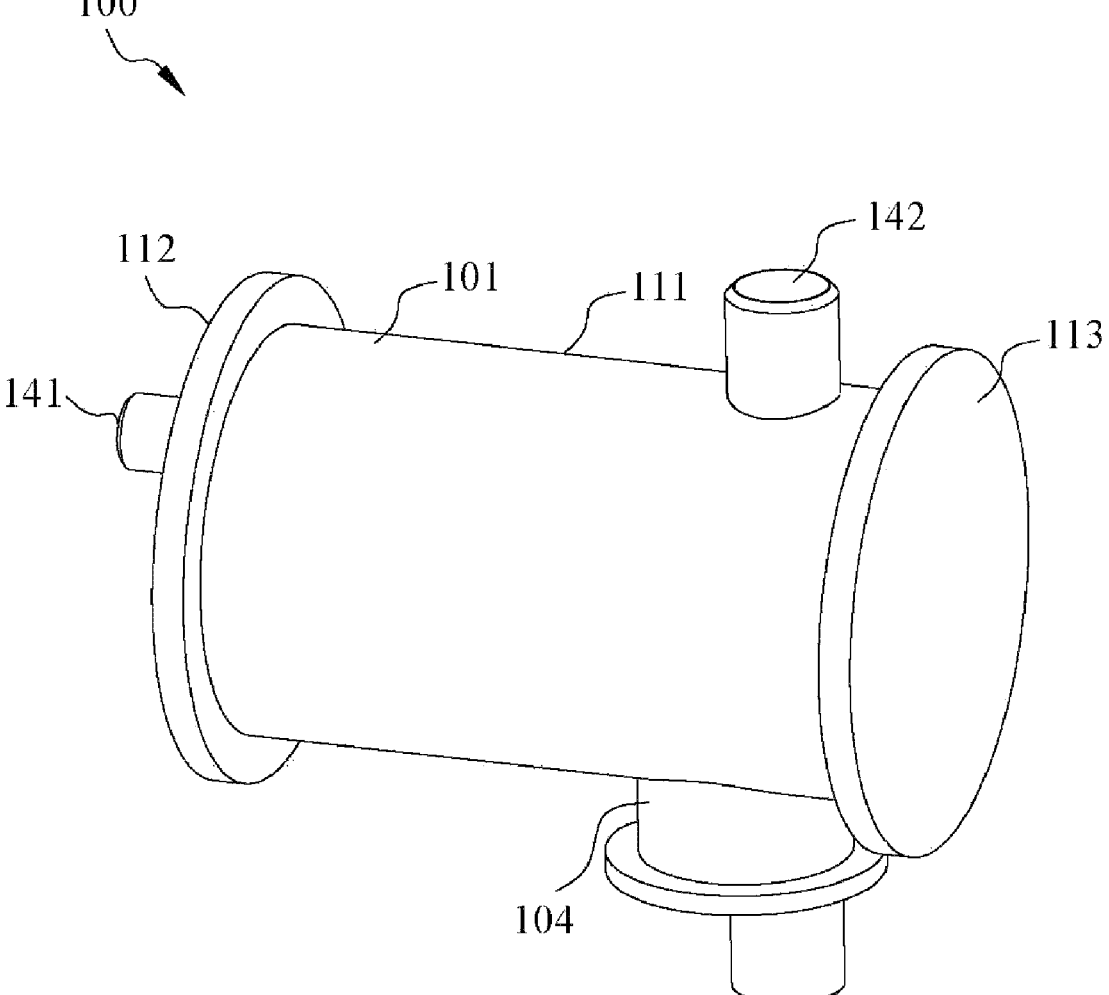
FIG. 1A shows a three-dimensional view of a gas-liquid separator according to a first embodiment of this application.

Various specific implementations of this application are to be described below with reference to the accompanying drawings which constitute a part of this specification. It should be understood that in the following accompanying drawings, the same reference numerals are used for the same parts.

Various specific implementations of this application are to be described below with reference to the accompanying drawings which constitute a part of this specification. It should be understood that although various example structural parts and elements of this application are described by using terms such as "up", "down", "left", "right", "top", "bottom", and the like indicating directions in this application, the terms are used herein only for convenience of explanation. The terms are determined based on the example orientations shown in the accompanying drawings. Since the embodiments disclosed in this application can be arranged in different directions, the terms indicating directions are only illustrative and should not be regarded as limitations.

Figure 1B:
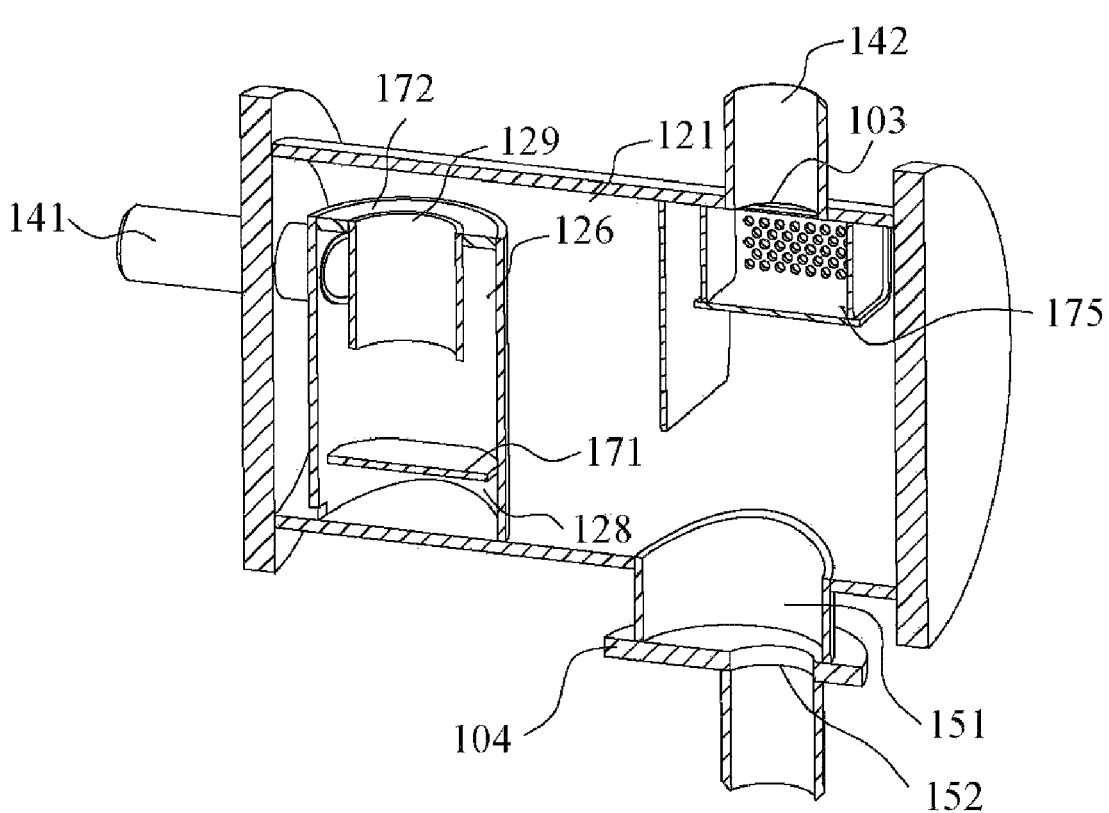
FIG. 1B shows a vertical sectional view of the gas-liquid separator shown in FIG. 1A.
Figure 1C:
FIG. 1C shows a transverse sectional view of the gas-liquid separator shown in FIG. 1A.
Figure 1C:
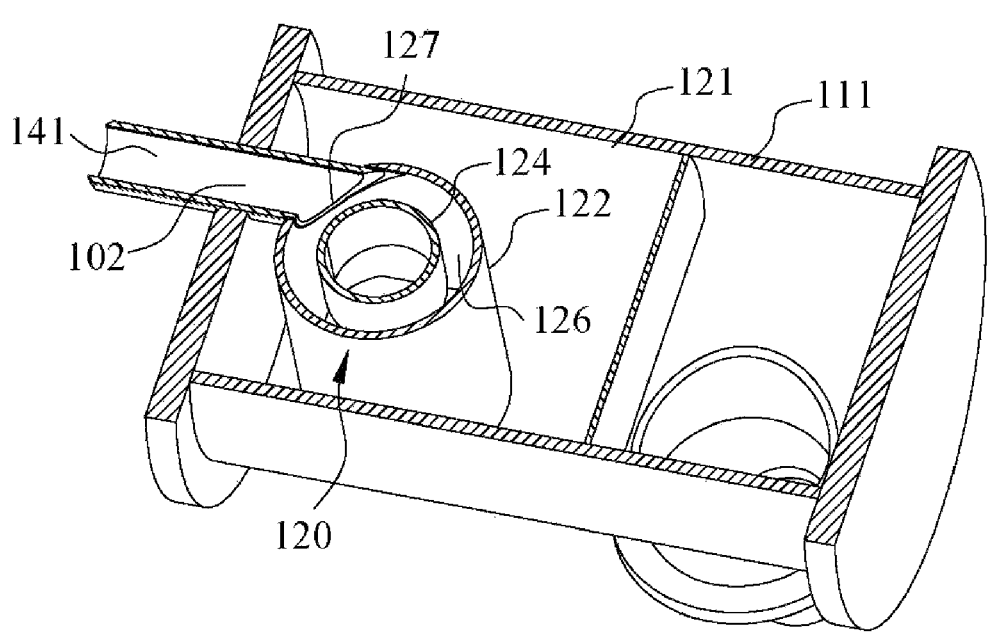
Figure 1D:
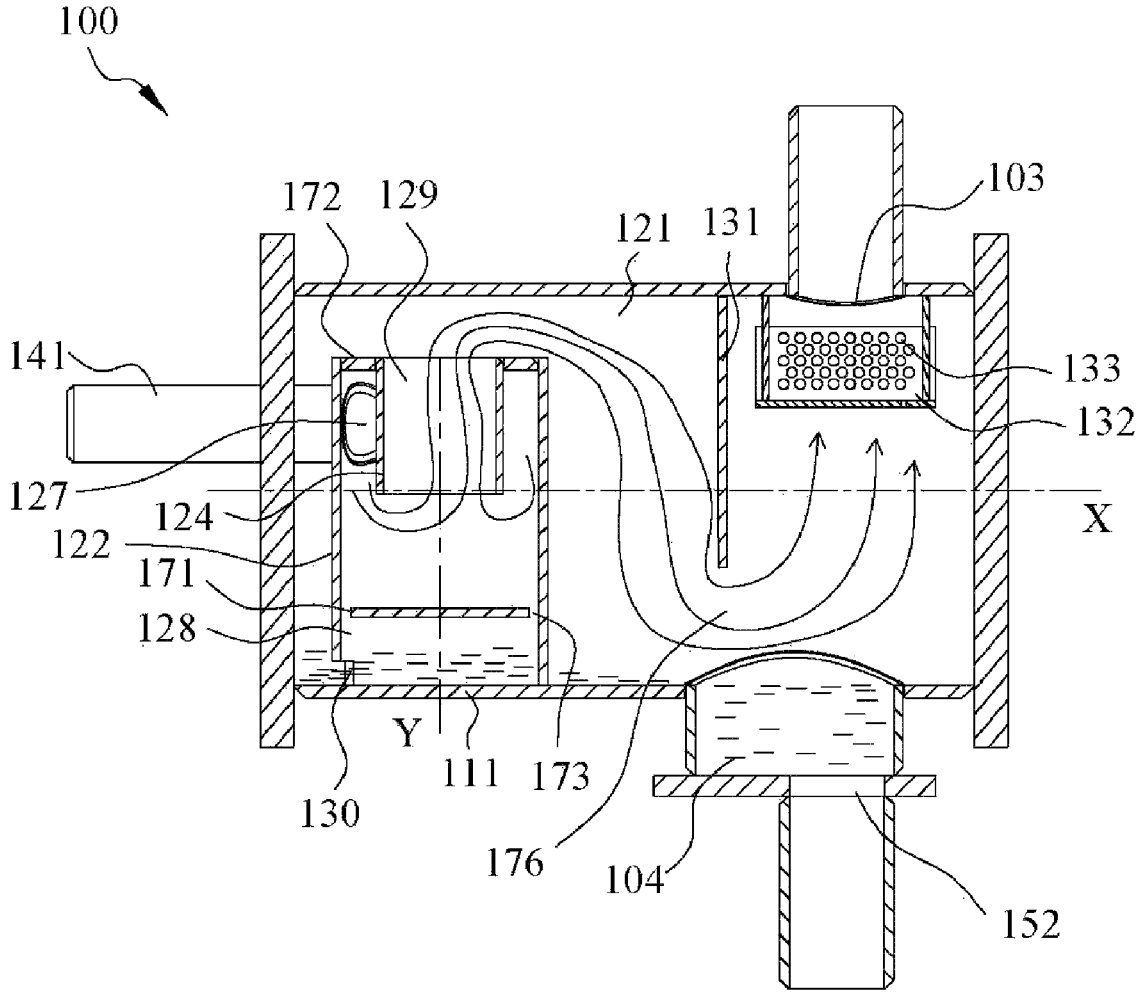
FIG. 1D shows an axial sectional view of the gas-liquid separator shown in FIG. 1A.

FIG. 1A shows a three-dimensional view of a gas-liquid separator 100 according to a first embodiment of this application. FIG. 1B shows a vertical sectional view of the gas-liquid separator 100 shown in FIG. 1A. FIG. 1C shows a transverse sectional view of the gas-liquid separator 100 shown in FIG. 1A. FIG. 1D shows an axial sectional view of the gas-liquid separator 100 shown in FIG. 1A. As shown in FIG. 1A to FIG. 1D, the gas-liquid separator 100 includes a housing 101. The housing 101 includes a cylindrical housing side wall 111 and a first end plate 112 and a second end plate 113 located at two opposite ends of the housing side wall 111. The cylindrical housing side wall 111 has a transverse axis X. The first end plate 112, the second end plate 113, and the housing 101 define a housing accommodating cavity 121. The housing 101 further includes a housing inlet 102 and an upper housing outlet 103. The housing inlet 102 is provided on the first end plate 112. The upper housing outlet 103 is provided at an upper part of the housing side wall 111. The gas-liquid separator 100 further includes an inlet tube 141 and an outlet tube 142. The inlet tube 141 is in communication with the housing inlet 102 to introduce a gas-liquid mixture into the gas-liquid separator 100. The outlet tube 142 is in communication with the upper housing outlet 103, and is used for guiding the separated gas out of the gas-liquid separator 100.

The gas-liquid separator 100 further includes a liquid storage device 104. The liquid storage device 104 is arranged below the housing side wall 111 and close to the second end plate 113. The liquid storage device 104 includes a liquid storage accommodating cavity 151 and a liquid storage outlet 152. The liquid storage accommodating cavity 151 is in communication with the housing accommodating cavity 121. The liquid storage outlet 152 is provided at a lower part of the liquid storage device 104, and is used for guiding the separated liquid out of the gas-liquid separator 100.

The gas-liquid separator 100 further includes a separation cylinder assembly 120 arranged in the housing accommodating cavity 121. The separation cylinder assembly 120 is arranged close to the first end plate 112, so that the separation cylinder assembly 120 is at a set distance from the liquid storage device 104. The separation cylinder assembly 120 includes an outer cylinder 122 and an inner cylinder 124. The outer cylinder 122 and the inner cylinder 124 have a same axis Y. The axis Y is arranged in a vertical direction. In other words, the axis Y of the separation cylinder assembly 120 is transverse to the axis X of the housing side wall 111. The outer cylinder 122 is supported on a bottom part of the housing side wall 111. The inner cylinder 124 is arranged in the outer cylinder 122, and an upper edge of the inner cylinder 124 is flush with an upper edge of the outer cylinder 122. A lower edge of the inner cylinder 124 is located in the middle of the outer cylinder 122, so that the outer cylinder 122 can define a lower space 128 located at the lower part of the separation cylinder assembly 120. The outer cylinder 122 is at a set distance from the inner cylinder 124 to form an annular separation space 126 at the upper part of the separation cylinder assembly 120.

The separation cylinder assembly 120 further includes a top plate 172 and an anti-vortex plate 171. The top plate 172 is annular and covers the upper edges of the outer cylinder 122 and the inner cylinder 124, so that a top of the separation space 126 is sealed by the top plate 172 and cannot be brought into communication with the housing accommodating cavity 121 through the top. In addition, since the top plate 172 does not cover a hollow part of the inner cylinder 124, the hollow part of the inner cylinder 124 forms an upper outlet 129. The lower space 128 located at the lower part of the separation cylinder assembly 120 can be brought into communication with the housing accommodating cavity 121 through the upper outlet 129. The anti-vortex plate 171 is horizontally arranged in the lower space 128, and a front part and a rear part of the anti-vortex plate are connected to the outer cylinder 122 to form a channel 173 with the outer cylinder 122 on the left and right.

The separation cylinder assembly 120 further includes an upper inlet 127 and a lower outlet 130. The upper inlet 127 is provided at the upper part of the outer cylinder 122 and close to the outer cylinder 122, so that the gas-liquid mixture can be close to the outer cylinder 122 when flowing into the annular separation space 126 at the upper part of the separation cylinder assembly 120. In the embodiment of this application, the inlet tube 141 extends from the outside of the gas-liquid separator 100 into the gas-liquid separator

100, and is in communication with the housing inlet 102 and the upper inlet 127 of the separation cylinder assembly 120, so that the gas-liquid mixture can directly enter the separation space 126 of the separation cylinder assembly 120. The lower outlet 130 is provided at a lower edge of the outer cylinder 122 and at a side facing away from the liquid storage device 104, so that the lower space 128 is brought into communication with the housing accommodating cavity 121 through the lower outlet 130. In this application, the lower outlet 130 is provided on the side of the outer cylinder 122 facing away from the liquid storage device 104, so that the lower outlet 130 can be as far away from the liquid storage device 104 as possible.

The gas-liquid separator 100 further includes a blocking plate 131. The blocking plate 131 is substantially located in the middle of the housing accommodating cavity 121. In other words, in the direction of the axis X of the cylindrical housing side wall 111, the blocking plate 131 is located between the upper outlet 129 of the separation cylinder assembly 120 and the upper housing outlet 103. The blocking plate 131 roughly divides the housing accommodating cavity 121 into a left part and a right part. The blocking plate 131 extends downward from a top of the housing side wall 111 beyond the upper outlet 129 of the separation cylinder assembly 120, and the lower end of the blocking plate 131 is at a set distance from the bottom part of the housing accommodating cavity 121, so as to form a blocking plate communication port 176, so that the gas-liquid mixture can flow from the left part of the housing accommodating cavity 121 to the right part of the housing accommodating cavity 121.

The gas-liquid separator 100 further includes a blocking box 132. The blocking box 132 includes a front plate and a rear plate oppositely arranged, a left plate and a right plate oppositely arranged, and a bottom plate located below the front plate, the rear plate, the left plate, and the right plate. The front plate, the left plate, the rear plate, and the right plate are connected in sequence, and are connected to the bottom plate, thereby forming a blocking box 132 with an upper opening. The upper part of the blocking box 132 is arranged around the upper housing outlet 103 and connected to the housing side wall 111. A plurality of communication holes 133 are provided on the front plate and the rear plate of the blocking box 132, so that the housing accommodating cavity 121 can be brought into communication with the upper housing outlet 103 through the plurality of communication holes 133. Holes 175 are formed on the bottom plate of the blocking box 132. The liquid in the gas-liquid mixture accumulates at the bottom part of the blocking box 132 after being separated in the blocking box 132. Through the holes 175, the liquid can be discharged from the blocking box 132 and fall to the bottom part of the housing accommodating cavity 121.

The movement trajectory and the separation process of the gas-liquid mixture after entering the gas-liquid separator 100 are specifically described below.

Referring to FIG. 1D, the gas-liquid mixture with a set speed can enter the gas-liquid separator 100 from the upper inlet 127 of the separation cylinder assembly 120 through the inlet tube 141. The gas-liquid mixture entering the annular separation space 126 moves along an annular path. During the movement, the gas-liquid mixture collides with the outer cylinder 122 and the inner cylinder 124. Since the liquid has a larger centrifugal force than the gas, after hitting the outer cylinder 122 and the inner cylinder 124, a part of the liquid (for example, a liquid with a larger mass) in the gas-liquid mixture flows down along the outer cylinder 122 and the inner cylinder 124 by gravity, and then fall on the bottom part of the separation cylinder assembly 120 after passing through the channel 173. The liquid falling on the bottom part of the separation cylinder assembly 120 can flow out of the separation cylinder assembly 120 from the lower outlet 130, into the bottom part of the housing accommodating cavity 121, and finally into the liquid storage device 104. On the other hand, after the gas-liquid mixture hits the outer cylinder 122 and the inner cylinder 124, the gas-liquid mixture separated from a part of the liquid flows downward to the lower space 128 of the separation cylinder assembly 120. Since the anti-vortex plate 171 is arranged in the lower space 128, the gas-liquid mixture flowing downward will not impact the liquid in the lower space 128, thereby preventing the gas-liquid mixture from carrying the separated liquid. A movement direction of the gas-liquid mixture flowing into the lower space 128 is changed, so that the gas-liquid mixture flows upward and flows out of the separation cylinder assembly 120 from the upper outlet 129. The movement direction of the gas-liquid mixture flowing out of the separation cylinder assembly 120 is changed again, so that the gas-liquid mixture flows downward through the blocking plate communication port 176 into the right part of the housing accommodating cavity 121. The movement direction of the gas-liquid mixture entering the right part of the housing accommodating cavity 121 continues to be changed into flowing upward, then flows into the blocking box 132 from the plurality of communication holes 133 on the front plate and the rear plate of the blocking box 132, and finally flows out of the gas-liquid separator 100 from the upper housing outlet 103.

The gas-liquid separator 100 of this application has at least the following advantages:

First, the gas-liquid separator 100 of this application can achieve high separation efficiency. Specifically, the gas-liquid separator 100 of this application can separate the liquid in the gas-liquid mixture twice with a high separation rate. In the first time, in the separation cylinder assembly 120, the liquid of the gas-liquid mixture flowing through the annular separation space 126 is separated by a centrifugal force. In the second time, after the gas-liquid mixture flows out of the annular separation space 126, the gas-liquid mixture undergoes a plurality of changes of movement direction in the housing accommodating cavity 121. Specifically, the flow space defined by the separation space 126 is relatively small, and the space of the housing accommodating cavity 121 flowing out of the annular separation space 126 is relatively large. The gas-liquid mixture flowing out of the annular separation space 126 enters the large space from the small space at a slower flow rate. For the gas-liquid mixture with a slower flow rate, since the mass of gas is different from the mass of the liquid, the liquid is easily separated from the gas when the movement direction of the gas-liquid mixture changes. Therefore, after the gas-liquid mixture flows out of the annular separation space 126, a part of the liquid in the gas-liquid mixture is to be separated every time the movement direction changes, and falls on the bottom part of the housing accommodating cavity 121 due to gravity.

Second, the liquid in the gas-liquid separator 100 of this application can form a liquid seal, thereby preventing the gas in the housing accommodating cavity 121 from flowing out of the gas-liquid separator 100 through the liquid storage outlet 152. Specifically, the liquid storage device 104 is arranged in the gas-liquid separator 100 of this application. The liquid storage accommodating cavity 151 has a large size, and can store a set amount of liquid and keep the liquid at a set height, thereby forming a liquid seal at the liquid storage outlet 152 of the gas-liquid separator 100 to prevent the gas in the housing accommodating cavity 121 from flowing out of the gas-liquid separator 100 through the liquid storage outlet 152.

Third, the gas-liquid separator 100 of this application has low noise. Specifically, during the flow of the gas-liquid mixture in the gas-liquid separator 100, the flow rate of the gas-liquid mixture just entering the gas-liquid separator 100 is the highest. Therefore, the noise generated when the gas-liquid mixture hits the gas-liquid separator 100 when entering the gas-liquid separator 100 is also the highest. In the gas-liquid separator 100 of this application, the gas mixture first enters the separation cylinder assembly 120 from the upper inlet 127, and the separation cylinder assembly 120 is arranged in the housing accommodating cavity 121. That is to say, when the gas-liquid mixture hits the separation cylinder assembly 120, the noise can be effectively blocked by the housing 101, thereby effectively reducing the noise generated to the outside by the gas-liquid separator 100.

Fourth, the gas-liquid separator 100 of this application has a compact structure and a small size. For a vertical gas-liquid separator with the same gas-liquid separation efficiency, the height of the gas-liquid separator 100 of this application is only about one third of the height of the vertical gas-liquid separator. For a horizontal gas-liquid separator with the same gas-liquid separation efficiency, the size of the gas-liquid separator 100 of this application is only about half of the size of the horizontal gas-liquid separator. The gas-liquid separator 100 with a small size can be adapted to an application scenario with low buildings, and can also be applied to the integrated refrigerating unit.

Figure 2:
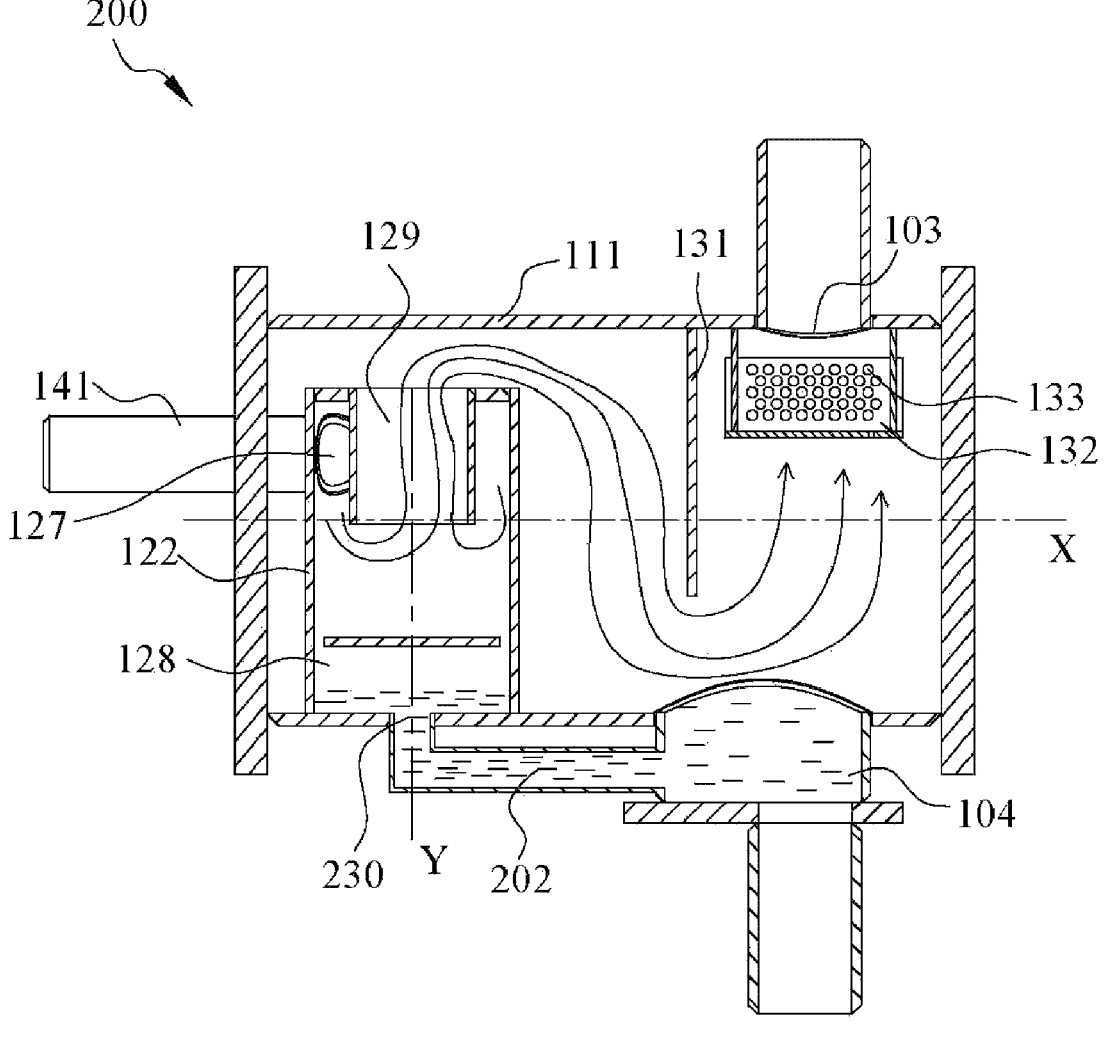
FIG. 2 shows an axial sectional view of a gas-liquid separator according to a second embodiment of this application.

FIG. 2 shows an axial sectional view of a gas-liquid separator 200 according to a second embodiment of this application. The gas-liquid separator 200 shown in FIG. 2 is basically the same as the gas-liquid separator 100 shown in FIG. 1A to FIG. 1D. The difference between the gas-liquid separator 200 shown in FIG. 2 and the gas-liquid separator 100 shown in FIG. 1A to FIG. 1D is that the lower outlet 130 is provided at the lower edge of the outer cylinder 122 of the gas-liquid separator 100 shown in FIG. 1A to FIG. 1D, so that the lower space 128 can be brought into communication with the liquid storage device 104 through the housing accommodating cavity 121, while the bottom part of the outer cylinder 122 of the gas-liquid separator 200 shown in FIG. 2 is enclosed by the housing side wall 111. A lower outlet 230 is provided at the housing side wall 111 enclosing the bottom part of the outer cylinder 122. The lower outlet 230 is in communication with the liquid storage device 104 through a connecting tube 202. Specifically, the gas-liquid separator 200 further includes the connecting tube 202. The connecting tube 202 is substantially located below the housing 101. One end of the connecting tube is connected to the lower outlet 230, and an other end is connected to a side wall of the liquid storage device 104, so that the liquid accumulated in the lower space 128 can flow into the liquid storage device 104 through the connecting tube 202.

A movement path of the gas-liquid mixture in the gas-liquid separator 200 and the gas-liquid separation effect that the gas-liquid separator 200 can achieve are substantially the same as those shown in the embodiment of the gas-liquid separator 100 shown in FIG. 1A to FIG. 1D, and the details are not described herein again. The gas-liquid separator 200 is superior to the gas-liquid separator 100 in that the liquid accumulated in the lower space 128 flows into the liquid storage device 104 through the connecting tube 202 rather than through the housing accommodating cavity 121. This arrangement has the advantage that the liquid is not easy to form a liquid level at the bottom part of the housing accommodating cavity 121, and the agitation of the liquid by the gas in the housing accommodating cavity 121 can be reduced.

Figure 3:
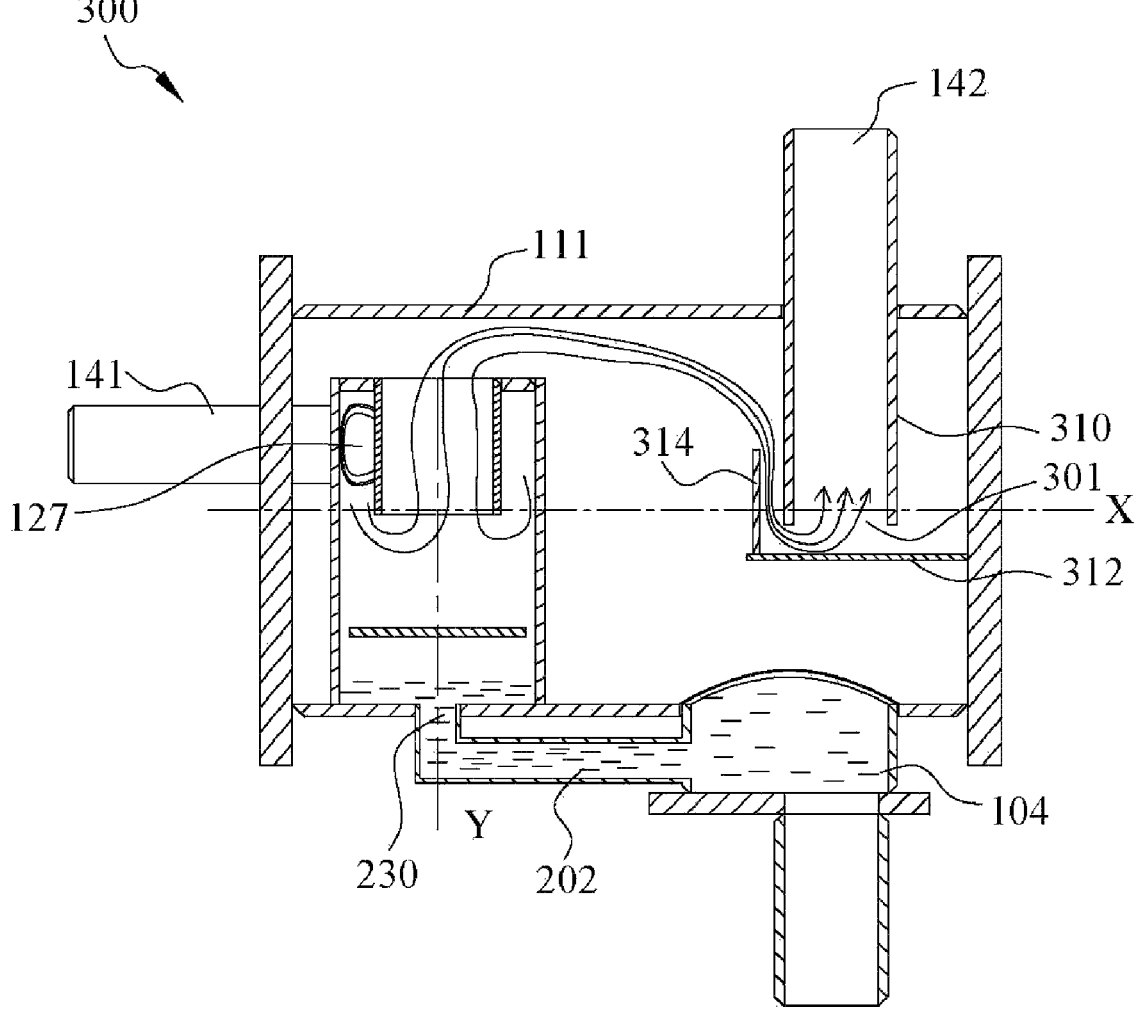
FIG. 3 shows an axial sectional view of a gas-liquid separator according to a third embodiment of this application.

FIG. 3 shows an axial sectional view of a gas-liquid separator 300 according to a third embodiment of this application. The gas-liquid separator 300 shown in FIG. 3 is basically the same as the gas-liquid separator 200 shown in FIG. 2, and the difference between the gas-liquid separator 300 shown in FIG. 3 and the gas-liquid separator 200 shown in FIG. 2 is that the gas-liquid separator 200 shown in FIG. 2 includes a blocking plate 131 and a blocking box 132 to change a movement path of a fluid flowing from an upper outlet 129 of the separation cylinder assembly 120 to the upper housing outlet 103, while the gas-liquid separator 300 shown in FIG. 3 includes a blocking tube 310, a transverse blocking plate 312, and a vertical blocking plate 314 to change a movement path of the fluid flowing from the upper outlet 129 of the separation cylinder assembly 120 to the upper housing outlet 103.

Specifically, the gas-liquid separator 300 includes the blocking tube 310, the transverse blocking plate 312, and the vertical blocking plate 314. The blocking tube 310 surrounds the upper housing outlet 103 and extends downward from the top of the housing side wall 111, and a blocking tube port 301 is formed on a bottom part of the blocking tube. In this embodiment, the blocking tube 310 is connected to the outlet tube 142. The transverse blocking plate 312 is arranged below the blocking tube 310 and at a set distance from the blocking tube port 301. The vertical blocking plate 314 extends upward from an upper surface of the transverse blocking plate 312. The vertical blocking plate 314 is arranged on a left side of the blocking tube 310 and at a set distance from the blocking tube 310. In other words, in the direction of the axis X of the cylindrical housing side wall 111, the vertical blocking plate 314 is located between the upper outlet 129 of the separation cylinder assembly 120 and the blocking tube 310. Therefore, the blocking tube 310, the transverse blocking plate 312, and the vertical blocking plate 314 define the channel from the housing accommodating cavity 121 to the blocking tube port 301, so that the moving direction of the gas-liquid mixture can be changed a plurality of times, thereby increasing the gas-liquid separation rate.

It should be noted that the blocking plate 131, the blocking box 132, the blocking tube 310, the transverse blocking plate 312, and the vertical blocking plate 314 are respectively used in the gas-liquid separator 200 and the gas-liquid separator 300 of this application to form the movement path of the fluid flowing from the upper outlet 129 of the separation cylinder assembly 120 to the upper housing outlet 103, but it can be understood by a person skilled in the art that any blocking member which is arranged in the housing accommodating cavity 121 and can form the movement path of the fluid flowing from the upper outlet 129 of the separation cylinder assembly 120 to the upper housing outlet 103 is within the protection scope of this application.

Although only some features of this application are illustrated and described herein, a person skilled in the art may make many modifications and changes. Therefore, it should be understood that the appended claims are intended to cover all of the above modifications and changes that fall within the essential spirit of this application.

What is claimed is:

1. A gas-liquid separator, wherein the gas-liquid separator comprises:

a housing, wherein the housing comprises a cylindrical housing side wall and a first end plate and a second end plate located at two opposite ends of the housing side wall, a housing accommodating cavity is defined by the housing side wall, the first end plate, and the second end plate, the housing further comprises a housing inlet and an upper housing outlet, the housing inlet is provided on the first end plate, and the upper housing outlet is provided at an upper part of the housing side wall; and a separation cylinder assembly, wherein the separation cylinder assembly is arranged in the housing accommodating cavity, an axis of the separation cylinder assembly is arranged transversely to an axis of the cylindrical housing side wall, the separation cylinder assembly comprises an outer cylinder and an inner cylinder arranged in the outer cylinder, the outer cylinder is supported on a bottom part of the housing side wall, the separation cylinder assembly further comprises a separation space defined between the outer cylinder and the inner cylinder and located at an upper part of the separation cylinder assembly, a lower space located at a lower part of the separation cylinder assembly, and an upper outlet located at the upper part of the separation cylinder assembly, the separation space is in communication with the housing inlet, and the upper outlet is in communication with the separation space and the housing accommodating cavity.

2. The gas-liquid separator according to claim 1, wherein the gas-liquid separator further comprises:

a liquid storage device, wherein the liquid storage device is arranged below the housing side wall and in communication with the housing accommodating cavity and the lower space of the separation cylinder assembly; and the liquid storage device is arranged at a set distance from the lower space of the separation cylinder assembly.

3. The gas-liquid separator according to claim 2, wherein a bottom part of the inner cylinder is at a set distance from the bottom part of the housing side wall, and the lower space is defined by the outer cylinder.

4. The gas-liquid separator according to claim 3, wherein a lower outlet is provided at the outer cylinder defining the lower space, and the liquid storage device is in communication with the lower space through the lower outlet and the housing accommodating cavity.

5. The gas-liquid separator according to claim 4, wherein the lower outlet is provided on a side of the outer cylinder facing away from the liquid storage device.

6. The gas-liquid separator according to claim 3, wherein a bottom part of the outer cylinder is enclosed by the housing, and a lower outlet is provided at the housing enclosing the bottom part of the outer cylinder; and the liquid storage device is in communication with the lower space through the lower outlet.

7. The gas-liquid separator according to claim 6, wherein the gas-liquid separator further comprises:

a connecting tube, wherein one end of the connecting tube is connected to the lower outlet, and another end of the connecting tube is connected to the liquid storage device.

8. The gas-liquid separator according to claim 1, further comprising:

at least one blocking member, arranged in the housing accommodating cavity around the upper housing outlet, wherein the at least one blocking member is configured to change a movement path of a fluid flowing from the upper outlet of the separation cylinder assembly to the upper housing outlet.

9. The gas-liquid separator according to claim 8, wherein the at least one blocking member comprises:

a blocking plate, wherein the blocking plate is located between the upper housing outlet and the upper outlet of the separation cylinder assembly in an axial direction of the cylindrical housing side wall and extends downward from a top of the cylindrical housing side wall beyond the upper outlet of the separation cylinder assembly; and a blocking box, wherein the blocking box is arranged around the upper housing outlet, and a plurality of communication holes are provided on a side wall of the blocking box.

10. The gas-liquid separator according to claim 8, wherein the at least one blocking member comprises:

a blocking tube, wherein the blocking tube surrounds the upper housing outlet and extends downward from a top of the housing side wall;

a transverse blocking plate, wherein the transverse blocking plate is arranged below the blocking tube and at a set distance from a bottom part of the blocking tube; and a vertical blocking plate, wherein the vertical blocking plate extends upward from the transverse blocking plate and is located between the blocking tube and the upper outlet of the separation cylinder assembly in an axial direction of the cylindrical housing side wall.

* * * * *